B. S. HYERS.
Self-Oiling Cups for Axle-Boxes

No. 154,487. Patented Aug. 25, 1874.

Witnesses.
H. W. Wells
William Jack

Inventor.
Benjamin S. Hyers

UNITED STATES PATENT OFFICE.

BENJAMIN S. HYERS, OF PEKIN, ILLINOIS.

IMPROVEMENT IN SELF-OILING CUPS FOR AXLE-BOXES.

Specification forming part of Letters Patent No. 154,487, dated August 25, 1874; application filed May 27, 1874.

*To all whom it may concern:*

Be it known that I, BENJAMIN S. HYERS, of the city of Pekin, in the county of Tazewell and in the State of Illinois, have invented a Self-Oiling Cup for Axle-Boxes, or any wheel which revolves upon an axle; and do hereby declare that the following is a full, clear, and exact description thereof, reference being had to the annexed drawings making a part of this specification, in which like letters of reference refer to like parts, and in which—

Figure 1:
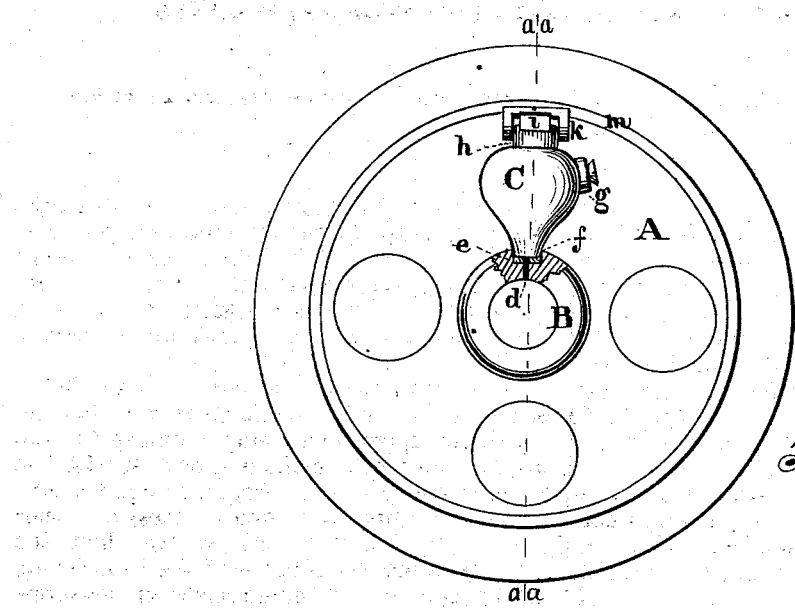
Figure 2:
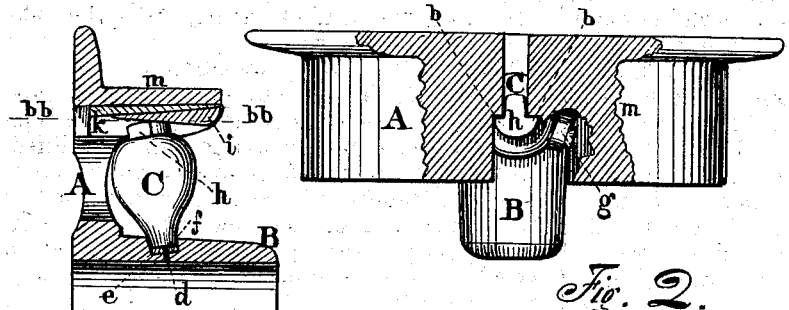
Figure 3:
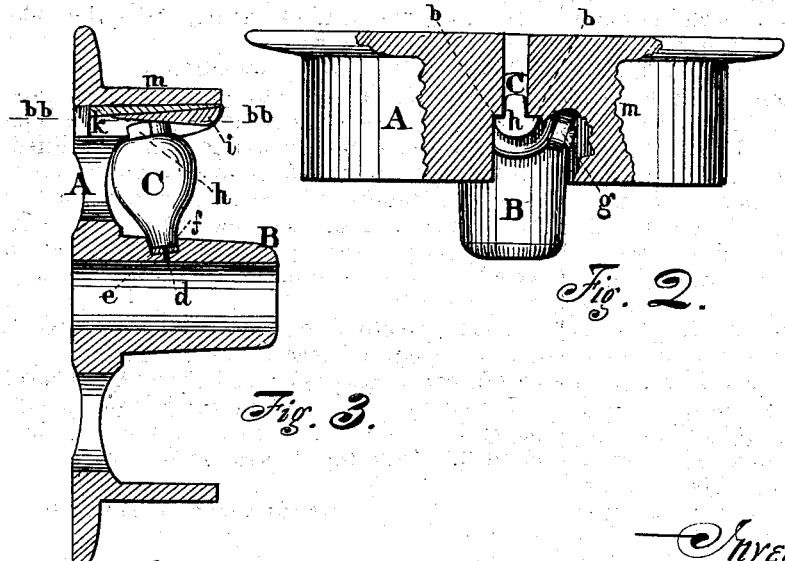

Figure 1 represents an elevation of wheel and cup applied to the axle-box; Fig. 2, a horizontal section through dotted line $b\ b\ b\ b$, Fig. 3; Fig. 3, a vertical section along line $a\ a\ a\ a$, Fig. 1.

The object of this invention is to provide a lubricating device to revolve with the axle-box of any wheel, pinion, pulley, or other similar mechanism, which revolves upon an axle or shaft, which cup, being reversed at every revolution, oils the axle-box and shaft.

To do this I provide a cup, C, having a lower opening, which may be pointed so as to sit upon a gasket or elastic cushion, $e$, of an annular form, resting in a socket, $f$, in the axle-box B of any wheel or pulley above the entrance to an oil-duct, $d$, which leads down to the axle or shaft. The cup may, when the wheel is small, as a car-wheel or pulley, be retained within said socket by having its upper end held within a groove or slot, or other recess, in the inner periphery of the rim, and be securely fastened by a wedge, $i$, placed between said cup top and the ceiling of such groove or slot, in such a manner as will allow of access to an oil-charging opening, $g$, in the side of or top of the cup; also, allowing the cup to be removed for the same purpose by taking out the wedge or removing a set-screw, which I use with equal effect.

To prevent too great a flow of oil when the cup is reversed by the revolution of the axle-box, the cup is filled with wicking or other suspending substance. The cup is firmly pressed down upon the gasket $e$ by means of the wedge $i$, leaving no chance for the escape of oil.

In a small wheel the cup C is set in its socket in the axle-box B, so as to incline inward, its upper end being retained in the above-mentioned inclined groove $k$, with the wedge $i$, and prevented from turning by means of the provision of a square recess on either side of the groove or slot $k$, into which the corresponding shoulders $b$ of the head or top of the cup fit. A thumb-screw or set-screw may also be used, instead of the wedge, to abut upon the head of the cup from the side of the inclined recess.

What I claim as my invention is—

1. An axle-box oil-cup provided with side opening $g$, shoulders or detents $b$ at the top, in combination with a wedge, $i$, and inclined groove $k$, or recess cut or formed in the inner surface of the rim of a wheel or pulley, for the purpose of wedging the tapering lower end of the cup into a recess, $f$, over an oil-duct, $d$, in an axle-box, B, substantially as and for the purposes specified.

9. The combination of the duct $d$, recess $f$, cushion $e$, cup C, head $h$, wedge $i$, slot or recess $k$, and rim $m$, substantially as described.

In testimony that I claim the foregoing self-oiling axle-box cup I have hereunto set my hand this 18th day of May, 1874.

BENJAMIN S. HYERS.

Witnesses:
  WILLIAM JACK,
  H. W. WELLS.